United States Patent [19]
Chen

[11] 4,366,876
[45] Jan. 4, 1983

[54] HYDRAULIC BELLOW TYPE SCALE

[76] Inventor: Jien C. Chen, 27-4, Section 2, Taichung Harbor Rd., Taichung, Taiwan

[21] Appl. No.: 297,221

[22] Filed: Aug. 28, 1981

[51] Int. Cl.³ .......................... G01G 3/14; G01G 5/04
[52] U.S. Cl. ................................. 177/210 C; 177/209
[58] Field of Search ..................... 177/208, 209, 210 C

[56] References Cited

U.S. PATENT DOCUMENTS 3,947,692  3/1976  Payne ................................. 177/209
4,306,629  12/1981  Powell ............................... 177/208

Primary Examiner—George H. Miller, Jr.
Attorney, Agent, or Firm—Lackenbach, Siegel, Marzullo, Presta & Aronson

[57] ABSTRACT

A hydraulic bellow type scale comprises a scale body, a plurality of hydraulic bellows, a variable capacitor, an integrated circuit and a display unit. By means of the pressure in the hydraulic bellow, the weight of an object on a pan of the scale body is transmitted in terms of force for the variable capacitor to translate into a capacitance signal. The capacitance signal is further calculated by the integrated circuit. The weight and price thus calculated are displayed by the display unit.

6 Claims, 6 Drawing Figures

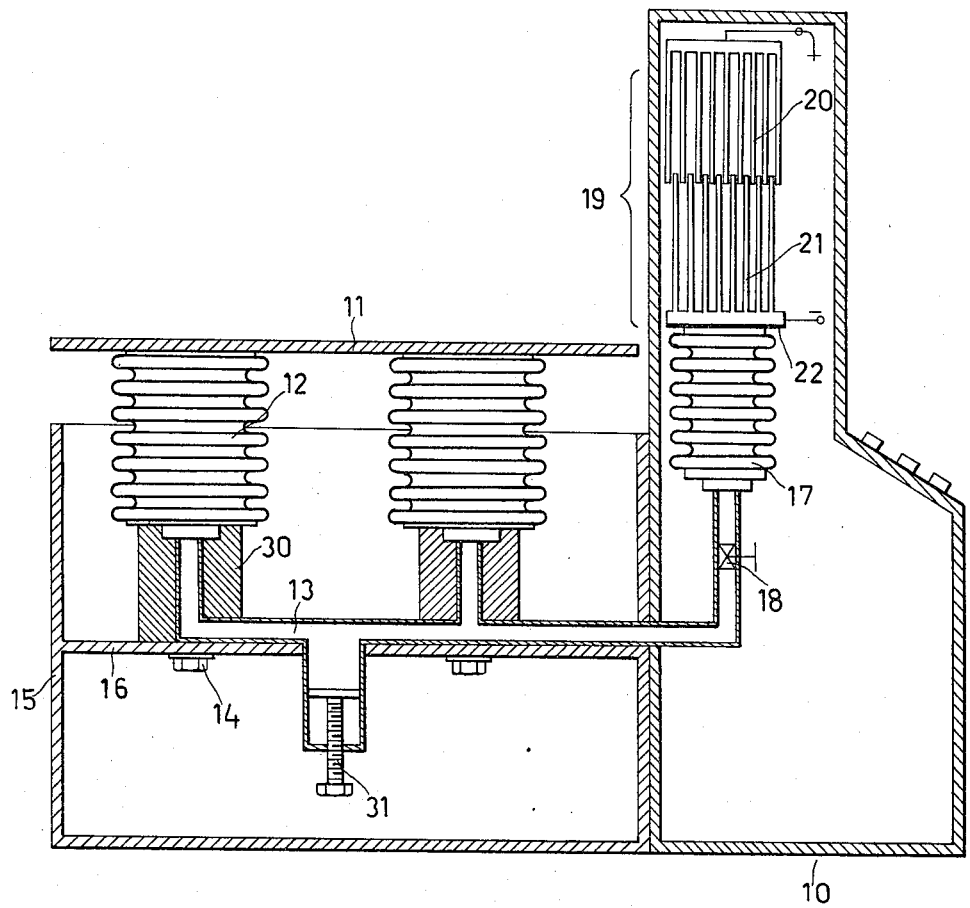
F I G. 1
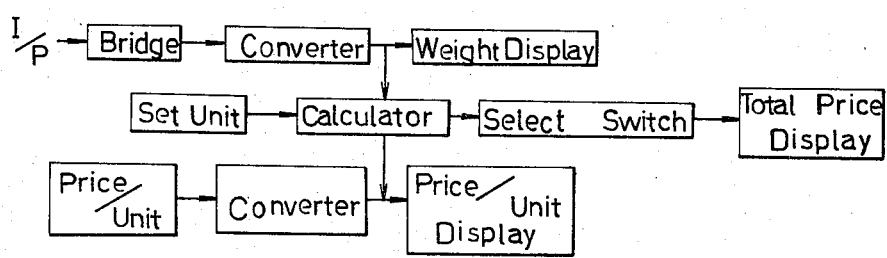
F I G. 3

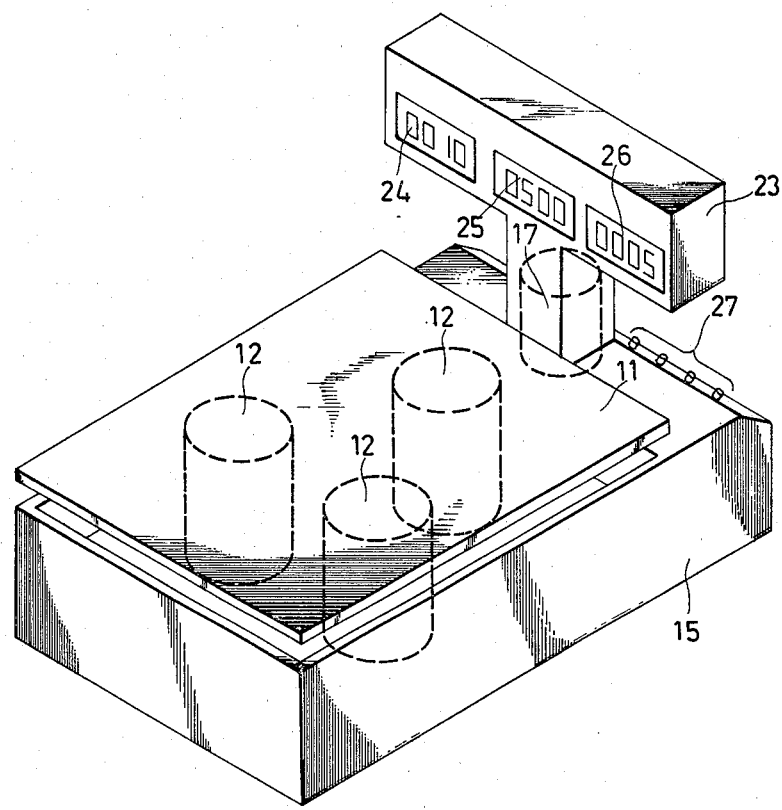
F I G. 2
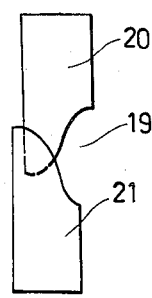
F I G. 4

HYDRAULIC BELLOW TYPE SCALE

BACKGROUND OF THE INVENTION

This invention relates to a weighing device, particularly to a hydraulic bellow type scale.

The simplest form of weighing device is the equal-armed beam scale. It consists of a beam pivotally mounted on a knife-edge fulcrum at the center. Attached to the center of the beam is a pointer which points vertically downwards when the scale is in equilibrium. The equal-armed scale requires a set of weights at least as heavy as heaviest load to be weighed. For the weighing of heavier objects, scales having arms of unequal length such as pendulum type weighing machine and letter balance are therefore used. Another type of scale is the spring balance. In this device the extension of the spring is proportional to the magnitude of the load suspended from it. The scale can be directly graduated in weight units. The familiar "bathroom scales" are also based on the spring balance principle. Since they are based on either lever balance or spring balance principle, the scales as set forth have relatively great error in measurement.

SUMMARY OF THE INVENTION

This invention relates to a weighing device, particularly to a hydraulic bellow type scale.

Accordingly, one object of this invention is to provide a hydraulic bellow type scale which decreases the error in measurement to ±0.05%.

Another object of this invention is to provide a hydraulic bellow type scale comprising a variable capacitor, an integrated circuit and a converter whereby a reading of the weight, the unit price and total price is obtainable.

Still another object of this invention is to provide a hydraulic bellow type scale comprising a total price display and a memory keyboard whereby the weights and unit prices of the objects can be respectively recorded and a reading of the total prices thereof is obtainable.

Still another object of this invention is to provide a hydraulic bellow type scale comprising a total price display and a memory keyboard whereby the daily, monthly or even yearly sales can be recorded and a reading of the total net profit is further obtainable.

BRIEF DESCRIPTION OF THE DRAWING

FIG. 1 is a partial sectional view of a preferred embodiment of this invention;

FIG. 2 is a perspective view of a preferred embodiment of this invention;

FIG. 3 is a block view of an integrated circuit of a preferred embodiment of this invention;

FIG. 4 is a side view illustrating variable capacitor's metal plates of a preferred embodiment of this invention;

DETAILED DESCRIPTION OF THE INVENTION

Figure 5:
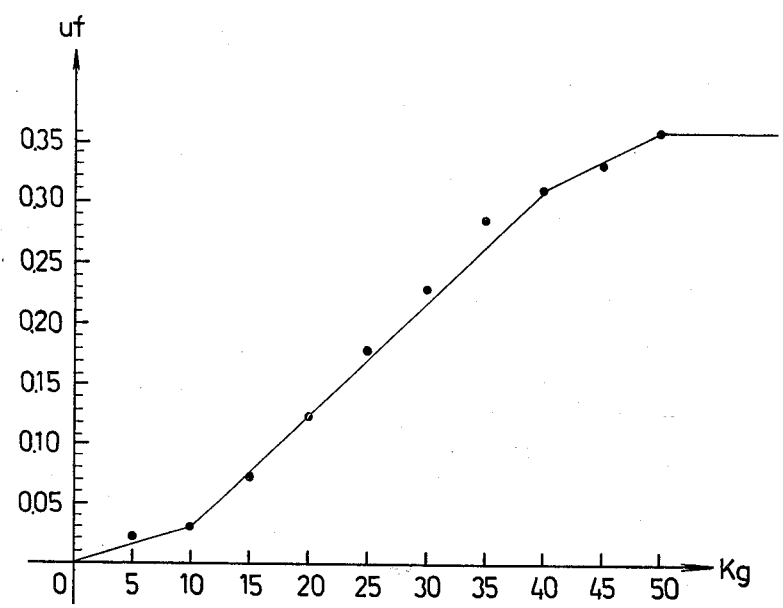
FIG. 5 is a capacitance and weight curve diagram before linear compensation in accordance with this invention.

As shown in FIG. 1, a hydraulic bellow type scale 10 is a weighing device having a capacity ranging from 0 to 50 kg. The hydraulic bellow type scale 10 comprises a scale body 15, an oblong pan 11 and a display unit 23. Three weight receiving bellows 12 of copper are secured to the bottom of the pan 11, each weight receiving bellow being 200 mm in diameter, 60 mm high and 0.2 mm thickness. The lower ends of the weight receiving bellows 12 are interconnected by a tube 13. Each of the three weight receiving bellows 12 is secured at the lower end thereof to an interim separation board 16 by means of a screw 14. As shown in FIG. 1, between the pan 11 and the scale body 15 there is left a space. The tube 13 has a confluent portion in which a screw type hydraulic adjuster 31 is provided.

A weight transmitting bellow 17 of copper, 200 mm in diameter and 80 mm high, is provided in a portion of the scale body 15. The tube 13 extends into the lower end of the weight transmitting bellow 17. A buffer 18 is provided in the tube 13 beneath the lower end of the weight transmitting bellow 17. A suitable liquid such as silicon oil is filled in the close space defined by the three weight receiving bellows 12, the weight transmitting bellow 17 and the tube 13. A variable capacitor 19 comprises an upper metal plate set 20 which are pivotally secured to the housing of scale body 15, and a lower metal plate set 21 which are pivotally secured to the upper end of the weight transmitting bellow 17 through an insulator 22. The output end of the variable capacitor 19 is connected to the input end of an IC operation display. When an object is placed on the pan 11, the weight receiving bellows 12 will deflect to change the volume of the close space defined by the weight receiving bellows 12, the weight transmitting bellow 17 and the tube 13, thus enabling the weight transmitting bellow 17 to raise the lower metal plate set 21. The lower metal plate set 21 thus raised and the upper metal plate set 20 will be crossed to change the capacitance. The changed capacitance will then be transmitted to the IC operation display.

The size of the weight receiving bellows 12 and the weight transmitting bellow 17 depends on what capacitance is desired. If the object to be weighed is heavier than the maximum capacitance of the hydraulic bellow type scale 10, the pan 11 will be stopped on the upper edge of the scale body 15. Therefore, in case of overload, the capacitance will not change and the parts will not break down. The screw type hydraulic adjustor 31 serves to adjust the pressure of the liquid within the close space defined by the weight receiving bellows 12, the weight transmitting bellow 17 and the tube 13. The screw type hydraulic adjustor 31 is provided in the tube 13, but preferably at the confluent portion of the tube 13. As the temperature varies from place to place, it is advisable to zero the hydraulic bellow type scale by adjusting the screw type hydraulic adjustor 31. Thus, the hydraulic bellow type scale can be used everywhere. The buffer 18 serves to obviate the hunting phenomenon caused by the rushing liquid when a heavy load is placed on the pan 11. With the buffer 18, the liquid can flow steadily into the weight transmitting bellow 17 and effect an output of steady capacitance. In one word, the buffer 18 is helpful for the duration and precision of the hydraulic bellow type scale 10 of this invention.

As shown in FIGS. 2 and 3, the variable capacitance signal of the variable capacitor 19 is detected by a bridge detecting device and further transmitted to an IC converter where it is transformed into a logic signal. The logic signal thus transformed is displayed by a weight display and simultaneously transmitted to a calculator in which there is stored a set unit. The calculator performs multiplication with the set unit and weight measured. The price thus multiplied passes over a select switch to a total price display where it is displayed. Circuit thereof may be variably designed.

As shown in FIG. 2, the display unit 23 in quadratic prism is provided in front of the scale body 15. The display unit 23 has three display zones on one side facing the scale body 15. The first display zone 24 serves to display unit price, weight unit being g, 100 g or kg. The second display zone 25 serves to display weight of an object, weight unit being g, 100 g or kg. The third display zone 26 serves to display the total price. As shown in FIGS. 1 and 2, a keyboard 27 is provided on an oblique surface of the scale body 15 so that the operator may control thereby.

Figure 6:
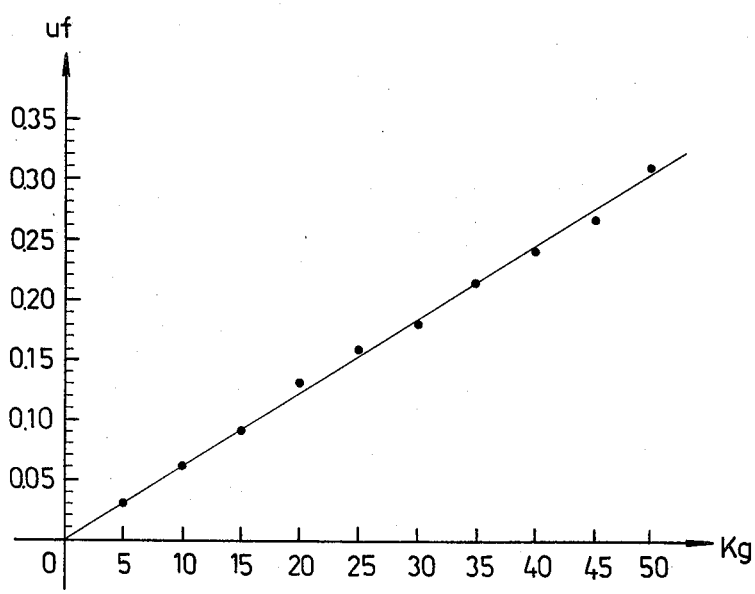
FIG. 6 is a capacitance and weight curve diagram after linear compensation in accordance with this invention.

As shown in FIGS. 4, 5 and 6, the upper and lower metal platesets 20, 21 of the variable capacitor 19 juxtapose one another with the ends which are in slanting curve. Such an arrangement will produce a compensation for the capacitance to change linearly in proportion to the weight measured. Thus, IC converter is easy to operate and the manufacturing cost thereof is lowered. Since as shown in FIG. 5 the volume of the bellows do not change linearly in proportion to the weight on the pan 11, it is preferable to modify partially the shape of the upper and lower metal plate sets 20, 21 of the variable capacitor 19 whereby the capacitance may, as shown in FIG. 6, change linearly in proportion to the weight measured. FIGS. 5 and 6 show the results of a series of experiments. The maximum effective area defined by the upper and lower metal plate sets 20, 21 of the variable capacitor 19 is 30 mm×18 mm. The other particulars are as follows; the distance between each two adjacent metal plates: 0.45 mm; total of the upper metal plates; 81 pieces; total of the lower metal plates; 80 pieces; the greatest capacitance: 0.36 uf.

According to this invention, the hydraulic adjustor 31 is used to mechanically do the zeroing. Before coming into market, the hydraulic bellow type scale of this invention is electronically zeroed or modified whereby it can be used everywhere. Furthermore, a reset key is provided on the keyboard. Thus, in case that the weight shown in the display zone does not start from zero, the operator may push the reset key to return the value to zero.

As many apparently widely different embodiments of this invention may be made without departing from the spirit and scope thereof, it is to be understood that the invention is not limited to the specific embodiments thereof except as defined in the appended claims.

What I claim is:

1. A hydraulic bellow type scale comprising
   a scale body;
   weight transmitting means provided in said scale body, said weight transmitting means comprising a set of weight receiving bellows and a set of weight transmitting bellows;
   a pan above said scale body, said pan being secured to the upper ends of said weight receiving bellows;
   a variable capacitor in said scale body, said variable capacitor comprising an upper metal plate set pivotally connected to the outer housing of said scale body and a lower metal plate set pivotally connected to said weight transmitting means, said upper metal plate set and said lower metal plate set juxtaposing one another and forming an output end therebetween;
   an IC calculator in said scale body, the input end of said IC calculator being connected with the output end of said variable capacitor;
   a display unit the input end of which is connected with the output end of said IC calculator; and
   a keyboard provided on one side of said scale body so that the operator may control said hydraulic bellow type scale thereby.

2. A hydraulic bellow type scale as claimed in claim 1 wherein said weight receiving bellows are secured to the under surface of said pan at the upper end and secured to an interim separation board of said scale body at the lower end; and
   said weight transmitting bellows are secured within the front portion of said scale body, said weight receiving bellows and said weight transmitting bellows being interconnected by a tube.

3. A hydraulic bellow type scale as claimed in claim 2 further comprising a hydraulic adjustor in said tube so that the hydraulic pressure within the closed space defined by said weight receiving bellows, said weight transmitting bellows and said tube is adjustable and can be zeroed.

4. A hydraulic bellow type scale as claimed in claim 3 further comprising at least a buffer in said tube beneath the lower end of said weight transmitting bellow so as to obviate the hunting phenomenon caused by the rushing liquid when a heavy load is placed on said pan.

5. A hydraulic bellow type scale as claimed in claim 1, 2, 3 or 4 wherein said upper metal plates and said lower metal plates are in slanting curve at the juxtaposed ends thereof whereby the capacitance may change linearly in proportion to the weight.

6. A hydraulic bellow type scale as claimed in claim 5 further comprising an insulator between said variable capacitor and said weight transmitting bellows.

* * * * *